Aug. 27, 1974   CARL-ARTUR AKERBLOM   3,832,245
METHOD OF MANUFACTURING AN OBJECT OF SILICON
STEEL HAVING LOW SULPHUR CONTENT
Filed May 30, 1972
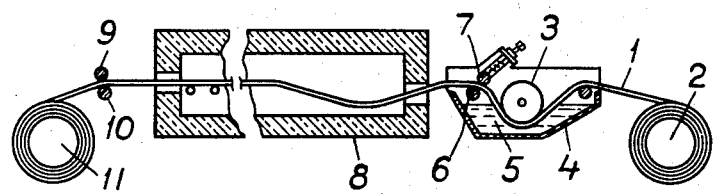

United States Patent Office 3,832,245
Patented Aug. 27, 1974

3,832,245
METHOD OF MANUFACTURING AN OBJECT OF SILICON STEEL HAVING LOW SULPHUR CONTENT
Carl-Artur Akerblom, Surahammar, Sweden, assignor to Allmanna Svenska Elektriska Aktiebolaget, Vasteras, Sweden
Filed May 30, 1972, Ser. No. 257,781
Claims priority, application Sweden, June 14, 1971, 7,658/71; May 5, 1972, 5,910/72
Int. Cl. H01f 1/04
U.S. Cl. 148—113    3 Claims

ABSTRACT OF THE DISCLOSURE

In manufacturing objects of silicon steel such as strip, sheet and rods for electrical equipment, there is applied to the surface of the material particles of a hydroxide of an alkaline earth metal or aluminium and/or a carbonate of an alkaline earth metal and/or oxide of alkaline earth metal or aluminium in combination with a vanadium compound. The object is then subjected to a heating at a temperature of at least 850° C., and preferably 1000–1300° C.

BACKGROUND OF THE INVENTION

(1) Field of the Invention

The invention relates to the manufacture of objects of silicon steel such as sheet and strip for motors, generators and transformers and rods for magnetic cores having low sulphur content.

(2) The Prior Art

When manufacturing sheet and strip of silicon steel, so-called electrical sheet and strip, the sheet material is subjected after the rolling to a heat treatment at about 850° C.–1350° C. in order to produce grain growth of the crystals which is necessary if the sheet material is to obtain the necessary magnetic properties.

Before the heat treatment the sheet material is coated with chemicals which during the heat treatment form an electrically insulating protective layer on the sheet material. One such known protective layer may consist of a reaction product of silicon dioxide formed on the surface of the sheet material and an oxide or hydroxide of an alkaline earth metal applied thereon. The application of the protective layer on the surface of the sheet material is performed by suspending the alkaline earth metal oxide or hydroxide in water then coating it on to the sheet material in an even layer, after which the sheet is subjected to the heat treatment previously mentioned, at a temperature of about 850° C.–1350° C. in hydrogen atmosphere for several hours. The temperature should, however, reach about 1000° C.–1350° C. if a well-developed glass film is to be formed on the sheet material. The hydroxide which is included in the suspension from the start or which is formed from the oxide by reaction with water, liberates water during the heating of the sheet material which, at temperatures below that mentioned above, is able to oxidize silicon in the steel to silicon dioxide without the iron being oxidized at the same time. The oxide which is formed from the hydroxide during the liberation of water, or which was possibly added from the start and has avoided hydration, reacts with the silicon dioxide at about 1000° C.–1350° C., thus forming the well-developed glass film on the surface of the sheet material, as mentioned earlier. The glass film can also be produced by the use of a carbonate of an alkaline earth metal. The carbon dioxide which the carbonate liberates upon being heated can oxidize silicon to silicon dioxide without the iron being oxidized. When the silicon dioxide has been produced, the formation of the glass continues in the manner described above. Any excess of oxide which has not reacted during the glass formation acts as spacer material between adjacent layers of the sheet whether these occur as turns in a roll or as lamina in a stack, thus preventing the layers from sticking or sintering together.

The process described above with heat treatment at about 1000° C.–1350° C. is normal in the manufacture of silicon steel with grain orientation where the formation of a glass film is particularly important.

Silicon steel without grain orientation normally contains a few tenths percent by weight aluminium, which means that no real glass film is formed during the heat treatment, even if this is carried out at about 1000–1350° C. The alkaline earth oxide instead remains as a layer serving principally as a spacer material. This is quite sufficient as a protective layer for silicon steel without grain orientation. In this case, it is also possible to replace the oxide or hydroxide of an alkaline earth metal normally used, by aluminium oxide or hydroxide.

SUMMARY OF THE INVENTION

According to the present invention it has been found possible to lower the magnetization losses both in silicon steel with grain orientation and in silicon steel without grain orientation. As far as the first type of silicon steel is concerned, it has also been found possible to improve the density of the glass film obtained during the heat treatment so that it is almost entirely free from pores, which considerably improves its insulation resistance.

The method of the present invention results in a lower sulphur content when the heat treatment is performed, which may explain the lower magnetization losses, for example by facilitating the grain growth.

The explanation of the improved quality of the glass film is that the removal of the sulphur in accordance with the present invention prevents the formation of metal sulphides, mainly manganese sulphide which, in the form of projections on the surface of the sheet material, may break through the glass film, thus making it inhomogeneous. The occurrence of these projections is particularly troublesome in cases when, as in normal, the sheet is pickled for a subsequent treatment, for example phosphatizing. The sulphide is then dissolved and gives rise to holes in the glass film, and thus to deteriorated insulating resistance.

The present invention relates to a method of manufacturing an object of silicon steel, such as in the form of sheet and strip for motors, generators and transformers and in the form of rods for magnetic cores having low sulphur content, which object is provided with a heat-resistant, electrically insulating coating consisting substantially of an oxide of an alkaline earth metal or aluminium or of a reaction product of an oxide of an alkaline earth metal and silicon dioxide, characterised in that particles of a hydroxide of an alkaline earth metal or of aluminium and/or a carbonate of an alkaline earth metal and/or an oxide of an earth alkali metal or aluminium and a vanadium compound are applied as a coating on the object, after which the object with its coating of particles and vanadium compound is subjected to heating to at least 850° C., preferably to 1000° C.–1350° C.

Heating to temperatures below 1000° C. will only be of interest in the manufacture of objects for which a well-developed glass film is not required, i.e. primarily in the manufacture of objects without grain orientation.

The heating may be performed in nitrogen or hydrogen or other inert or reducing atmosphere, preferably in batch annealing furnaces. The temperature is raised continuously from ambient temperature to the temperature stated above.

The time taken for the heating process is several hours and the time during which said temperature is maintained is also several hours.

Particularly preferred vanadium compounds are vanadium(V) compounds and other vanadium compounds than vanadium(V) compounds which, when they have been applied on the sheet, are converted into vanadium(V) compounds at some stage in the treatment of the sheet. As examples of vanadium compounds suitable may be mentioned vanadium(V) oxide, vanadates of various types, such as ortho, pyro, metha, and polyvanadates of various metals such as alkali metals, for example sodium and potassium, alkaline earth metals, for example magnesium, calcium, barium and strontium, aluminium and titanium, as well as ammonium and corresponding vanadium acids. Besides containing vanadium, these compounds also contain oxygen. Other vanadium compounds than those containing oxygen are also possible, for example vanadium(V) carbide, but the latter compound results in carbonization at high temperatures.

The vanadium compound encourages the liberation of sulphur from the silicon steel by catalyzing the formation of sulphur oxides which disappear in gaseous form. For this reason no sulphides are formed which break through the glass film. For this purpose a quantity of vanadium compound which stoichiometrically corresponds to a quantity of vanadium(V) oxide of 0.001 g. per m.$^2$ of the surface of the object, is sufficient.

If used in larger quantities the vanadium compound can also oxidize silicon in the silicon steel so that it can react with the earth alkali metal oxide to form glass. In this case quantities of up to 10 g. per m.$^2$ of the surface of the object are suitable.

The vanadium compound can be added to a water suspension of the other components or be mixed with these, for example an earth alkali metal oxide in dry form, which latter mixture can be powdered on to the sheet.

Magnesium is particularly preferred as alkaline earth metal, but calcium, barium and strontium may also be used.

The present invention can be used both in the manufacture of objects of silicon steel with grain orientation and in the manufacture of objects of objects of silicon steel without grain orientation. In silicon steel with grain orientation the silicon content is normally about 3 percent by weight and in silicon steel without grain orientation about 0.3–5 percent by weight.

The quantity of earth alkali compound or aluminum compound coated on the sheet depends on the thickness of the sheet. In most cases in practice, however, the total quantity of these substances applied on the object together with the vanadium compound, calculated as vanadium(V) oxide, is about 3–30 g. per m.$^2$ of the surface of the object. When applying this quantity of the material on objects of silicon steel not containing aluminium, i.e. usually with grain orientation, and heating to the temperature necessary for the formation of glass, the thickness of the glass film is about 0.1–10 microns. Particularly favourable results are obtained with a thickness within the range 0.5–5 microns and a thickness of 0.5–1.5 microns is particularly preferred.

The size of the particle material used as the earth alkali compound or aluminium compound is less than 250 microns, preferably less than 50 microns. For the vanadium compound, the grain size should be about 1–25 microns, preferably less than 10 microns if it is used in granular form.

BRIEF DESCRIPTION OF THE DRAWINGS

The invention will be more fully explained by describing a number of examples with reference to the accompanying drawing in which the figure shows schematically a device for applying a protective layer as one stage in the manufacture of an object of silicon steel in accordance with the present invention.

DESCRIPTION OF THE PREFERRED EMBODIMENTS

In the drawing 1 designates a strip of silicon steel. The strip is drawn from a coil on a reel 2 and passes under a roll 3 which rotates in a pan 4 containing a slurry 5 of the particulate material with which the strip is to be coated. The strip is then passed between the wiping rollers 6 and 7, which are suitably covered with rubber, and into a furnace 8 where it is dried at a temperature of about 100° C. for about 30 sec. before being wound up on the reel 11 after passing the transport rollers 9 and 10. The concentration of the particulate material is adjusted with respect to the profile of the rubber rollers 6 and 7 and to the roller pressure so that the desired layer thickness of the coated material is obtained. The coil is annealed at high temperature in a batch annealing furnace at about 1000° C.–1350° C. in hydrogen atmosphere for several hours, whereupon a protective layer is formed on the strip.

The slurry may also be applied by means of spraying.

The following examples indicate suitable compositions of the slurry 5 and its manufacture and examples of alternative application of the particle material.

Example 1

98 parts by weight magnesium oxide consisting of particles having to 60 percent by weight a grain size less than 5 microns and otherwise a grain size less than 50 microns and 2 parts by weight vanadium(V) oxide having a grain size of 5 microns are suspended in 900 parts by weight water. The suspension is stored for about 24 hours at ambient temperature, the vanadium(V) oxide then forming a magnesium vanadate with the magnesium compound. The suspension is then applied on a strip of silicon steel which has been pretreated to give orientated crystals and which has a thickness of 0.2 mm. When the strip has been dried it is heated gradually in hydrogen to 1200° C. and kept at this temperature for several hours. Desulphurization then takes place due to the action of the vanadium compound at the same time as grain growth and formation of a glass film due to the reaction between magnesium oxide and silicon dioxide takes place on the surface of the strip. The silicon dioxide is formed by oxidation of silicon both with water coming from the magnesium hydroxide formed during hydration of the magnesium oxide and also with the vanadium compound.

Example 2

A suspension is prepared and applied in the same way as in Example 1 with the difference that instead of 98 parts by weight magnesium oxide, 98 parts magnesium carbonate are used. Also in this case a magnesium vanadate is formed during storage of the suspension for about 24 hours before application on the sheet.

Example 3

A suspension is prepared and applied in the manner described in Example 1 with the difference that instead of 98 parts by weight magnesium oxide and 2 parts by weight vanadium(V) oxide, 99 parts by weight magnesium hydroxide and 1 part by weight vanadium(V) oxide are used. Also in this case a magnesium vanadate is formed during storage of the suspension for about 24 hours before application on the sheet.

Example 4

A suspension is prepared and applied in the manner indicated in Example 1 with the difference that instead of a strip intended to give grain orientation a strip is used which has been pretreated not to give grain orientation, said strip containing 0.3 percent by weight aluminium and having a thickness of 0.5 mm. In this case no proper glass film is formed, but a protective layer consisting substantially of magnesium oxide which has not reacted with the silicon dioxide on the surface of the strip.

Example 5

98 parts by weight magnesium oxide consisting of particles having to 60 percent by weight a grain size less than 5 microns and otherwise a grain size less than 50 microns are mixed with 2 parts by weight magnesium vanadate having a particle size of 5 microns. The mixture is powdered on to a silicon strip which has been pretreated to give oriented crystals and has a thickness of 0.3 mm. The quantity of mixture applied is 10 g. per m.² strip surface. The strip is heat-treated in the manner indicated in Example 1.

Example 6

8 parts by weight vanadium(V) oxide is dissolved while being gently heated in 500 parts by weight water containing 15 parts by weight 25% (weight percent) ammonia. 100 parts by weight magnesium oxide are added to the solution, a suspension then being obtained at the same time as a soluble magnesium-ammonium vanadate is formed. The suspension is applied on a strip in the manner indicated in Example 1.

Example 7

As suspension is prepared and applied in the same manner as indicated in Example 1 with the difference that the suspension is applied within one hour of being prepared, the vanadium(V) oxide then not forming vanadate, but remaining substantially in the form of particles of vanadium(V) oxide.

Example 8

A suspension is prepared and applied in the same manner as indicated in Example 7 with the difference that instead of 98 parts by weight magnesium oxide, 98 parts by weight magnesium carbonate are used.

Example 9

A suspension is prepared and applied in the manner indicated in Example 7 with the difference that instead of 98 parts by weight magnesium oxide and 2 parts by weight vanadium(V) oxide, 99 parts by weight magnesium hydroxide and 1 part by weight vanadium(V) oxide are used.

Example 10

A suspension is prepared and applied in the manner indicated in Example 7 with the difference that instead of a strip intended to give grain orientation, a sheet is used which has been pre-treated not to give grain orientation, said sheet containing 0.3 percent by weight aluminium and having a thickness of 0.5 mm. In this case no proper glass film is formed, but a protective layer consisting substantially of magnesium oxide which has not reacted with the silicon dioxide on the surface of the strip.

Example 11

98 parts by weight magnesium oxide consisting of particles which to 60 percent by weight have a grain size less than 5 microns and otherwise a grain size less than 50 microns are mixed with 2 parts by weight vanadium(V) oxide with a grain size of 5 microns. The mixture is powdered on to a silicon strip which has been pre-treated to give orientated crystals and which has a thickness of 0.3 mm. The quantity of mixture applied is 10 g. per m.² strip surface. The strip is heat-treated in the manner indicated in Example 7.

In a strip which has been treated in the manner described in any of Examples 1-11, the sulphur content in the strip itself is 0.001% and in the strip with glass film (or other protective layer) 0.002%. In corresponding strips on which the glass film (protective layer) has been applied without the use of vanadium compound, the sulphur content in the strip itself is about 0.002% and in the strip with glass film (protective layer) about 0.022%. After corrosion tests using 15% nitric acid at ambient temperature, no through-corrosion was obtained at all on the first strip, while the latter strip was completely dissolved after 1 minute.

When the sheet or strip has been treated in accordance with the invention it can be used as sheet and strip for motors, generators and transformers. If desired, an additional protective layer can be applied over the glass film or on the sheet or strip itself if no proper glass film exists. For example, the sheet or strip may be treated with phosphoric acid or metal phosphates according to well known methods, for example according to Swedish Pat. No. 129,585. Only one example will therefore be given of a suitable method of applying a phosphate layer.

A strip which has been treated in any of the ways described in Examples 1-11 is pickled with 10% sulphuric acid for 15-30 seconds. When the strip has been rinsed with water, a magnesium orthophosphate or other earth alkali phosphate is applied on the strip in the form of a water solution containing 100 g. magnesium orthophosphate per litre of solution. The coating is then baked in a furnace at 800-900° C. for 2-3 minutes, a methaphosphate layer then being formed.

I claim:
1. Method of manufacturing an object of silicon steel provided with a heat-resistant, electrically insulating coating consisting essentially of an oxide of an alkaline earth metal or aluminum or of a reaction product of an oxide of an alkaline earth metal and silicon dioxide, said coating being in direct contact with the object of silicon steel, said method comprising applying directly to the surface of the object particles of (1) a substance selected from the group consisting of hydroxides and oxides of alkaline earth metals and aluminum and alkaline earth metal carbonates and (2) a vanadium compound selected from the group consisting of vanadium(V) oxide and alkaline earth metal vanadates as a coating on the object and subjecting the object with its coating of particles and vanadium compound to heating to at least 850° C. in an inert or reducing atmosphere for a time sufficient to form a glass film having a thickness of about 0.1-10 microns, the quantity of vanadium compound stoichiometrically corresponding to a quantity of vanadium(V) oxide of 0.001-10 g. per m.² of the surface of the object and the total quantity of particles and vanadium compound stoichiometrically corresponding to vanadium(V) oxide together being about 3-30 g. per m.² of the surface of the object.

2. Method according to claim 1, in which the vanadium compound is vanadium(V) oxide.

3. Method according to claim 1, in which the alkaline earth metal consists essentially of magnesium.

References Cited

UNITED STATES PATENTS 3,396,044   8/1968   Satterfield _____ 148—13.1

WALTER R. SATTERFIELD, Primary Examiner

U.S. Cl. X.R.

148—31.5, 27; 117—129